United States Patent
Rehkemper et al.

(10) Patent No.: US 6,626,079 B1
(45) Date of Patent: Sep. 30, 2003

(54) PNEUMATIC MOTOR

(75) Inventors: Jeffrey Rehkemper, Chicago, IL (US); Charles Hartlaub, Glendale Heights, IL (US)

(73) Assignee: Rehco, LLC, Chicago, IL (US)

( * ) Notice: Subject to any disclaimer, the term of this patent is extended or adjusted under 35 U.S.C. 154(b) by 0 days.

(21) Appl. No.: 10/112,665

(22) Filed: Mar. 28, 2002

(51) Int. Cl.$^7$ ................................................. F01L 21/02
(52) U.S. Cl. ........................................... 91/325; 91/343
(58) Field of Search .................... 60/370; 91/341 R, 91/343, 303, 316, 325; 92/140

(56) References Cited

U.S. PATENT DOCUMENTS

| | | |
|---|---|---|
| 724,262 A | 3/1903 | Cole |
| 819,653 A | 5/1906 | Hawke |
| 2,596,000 A | 5/1952 | Weiss |
| 2,821,808 A | 2/1958 | Rosato |
| 3,078,033 A | 2/1963 | Ovrutsky |
| 3,645,169 A | 2/1972 | Clark |
| 3,703,848 A | * 11/1972 | Brown, IV ............ 91/325 |
| 3,716,310 A | 2/1973 | Guenther |
| 3,799,034 A | 3/1974 | Haglund et al. |
| 3,910,160 A | 10/1975 | Divine |
| 4,329,806 A | 5/1982 | Akiyama |
| 4,614,085 A | 9/1986 | Neukomm |
| 4,765,292 A | 8/1988 | Morgado |
| 4,766,802 A | 8/1988 | Caenzazzo et al. |
| 4,829,954 A | 5/1989 | Morgado |
| 4,885,978 A | 12/1989 | Caenazzo et al. |
| 4,979,878 A | * 12/1990 | Short et al. ............ 417/255 |
| 5,261,311 A | 11/1993 | Cloup |
| 5,515,675 A | 5/1996 | Bindschatel |
| 5,819,533 A | 10/1998 | Moonen |
| 6,006,517 A | 12/1999 | Kownacki et al. |
| 6,006,519 A | 12/1999 | Hormell, Jr. |
| 6,085,631 A | 7/2000 | Kownacki |
| 6,230,605 B1 | 5/2001 | Kowaacki |
| 6,311,486 B1 | 11/2001 | Negre et al. |

FOREIGN PATENT DOCUMENTS

| | | |
|---|---|---|
| GB | 2018366 | 10/1979 |
| GB | 2029908 | 3/1980 |
| GB | 2100363 | 12/1982 |

* cited by examiner

Primary Examiner—Edward K. Look
Assistant Examiner—Thomas E. Lazo

(57) ABSTRACT

In one embodiment a pneumatic motor is provided that includes an intake chamber in fluid communication with at least one intake channel. Each intake channel is further in fluid communication with a corresponding cylinder, which receives a piston that cycles upwardly and downwardly to rotate a motor axle. A member is placed in each intake channel to seal the corresponding cylinder from each intake channel when compressed fluid in the intake channel has a higher pressure then pressure in the corresponding cylinder. Each piston includes an actuator extending downwardly from the piston and having a profile that, during a portion of the upward cycle of the piston, causes the actuator to push the member back into each intake channel to allow compressed fluid into each of the corresponding cylinders. Each piston includes a section that has a diameter that creates a seal against the corresponding cylinder during the upward cycle of the piston. Compressed fluid that enters the corresponding cylinder during the upward cycle will push the piston upwardly. Each section further includes exhaust grooves defined thereon such during the downward cycle of the piston the seal is broken allowing compressed fluid in the cylinder to bypass the piston and escape through a vent above each cylinder. This causes the compressed fluid in the intake channel to push the member to re-seal the cylinder. The upward movement of the piston further generates inertia that moves the piston downward to continue the cycle.

52 Claims, 6 Drawing Sheets

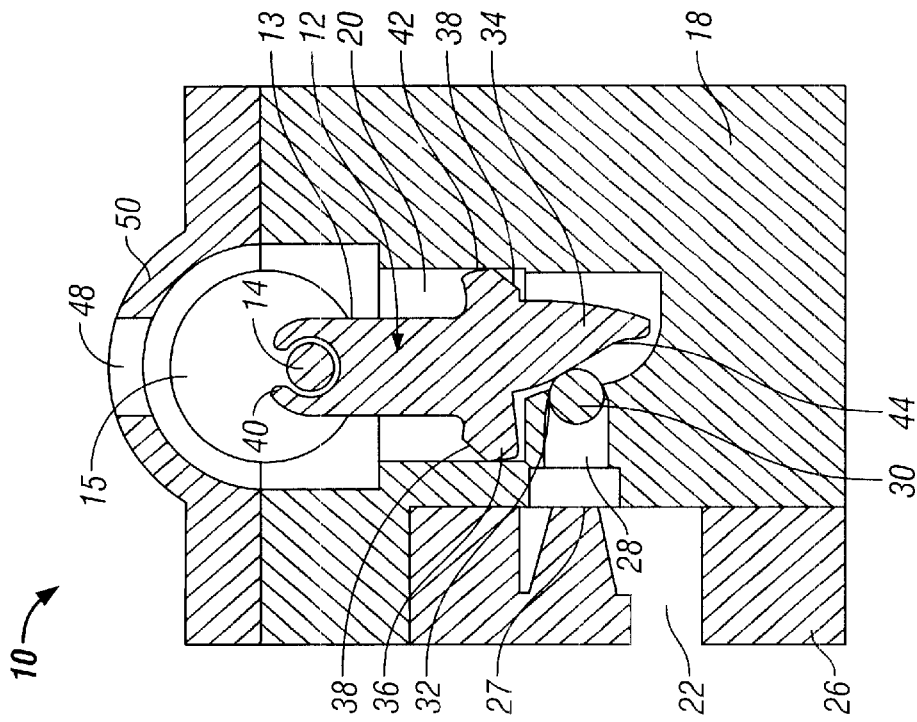
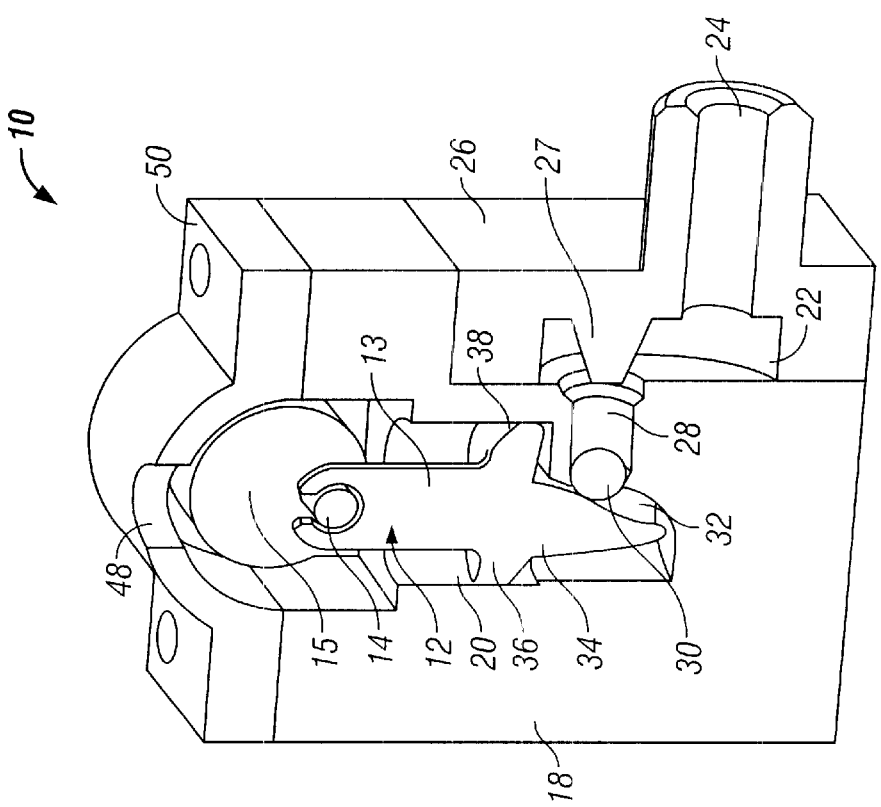
FIG. 1
FIG. 2

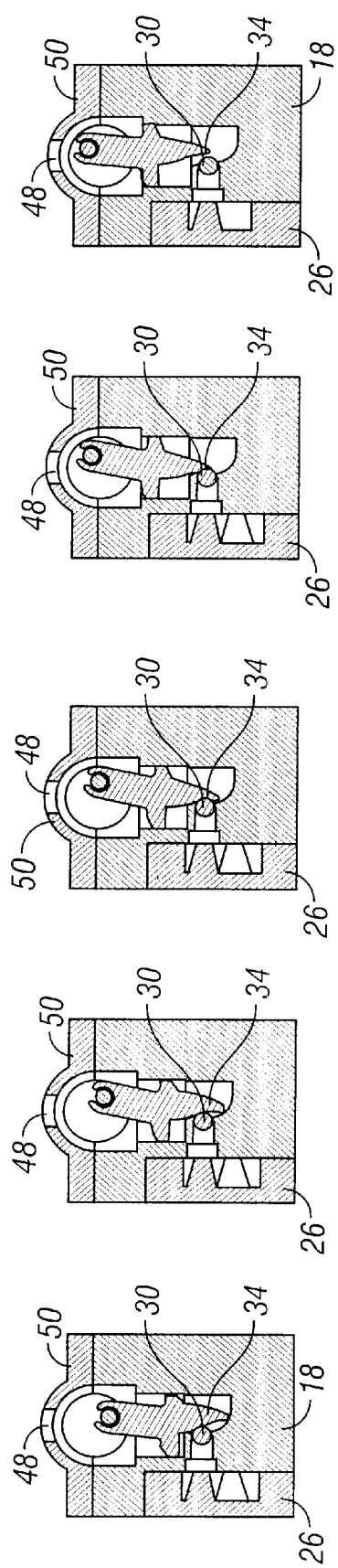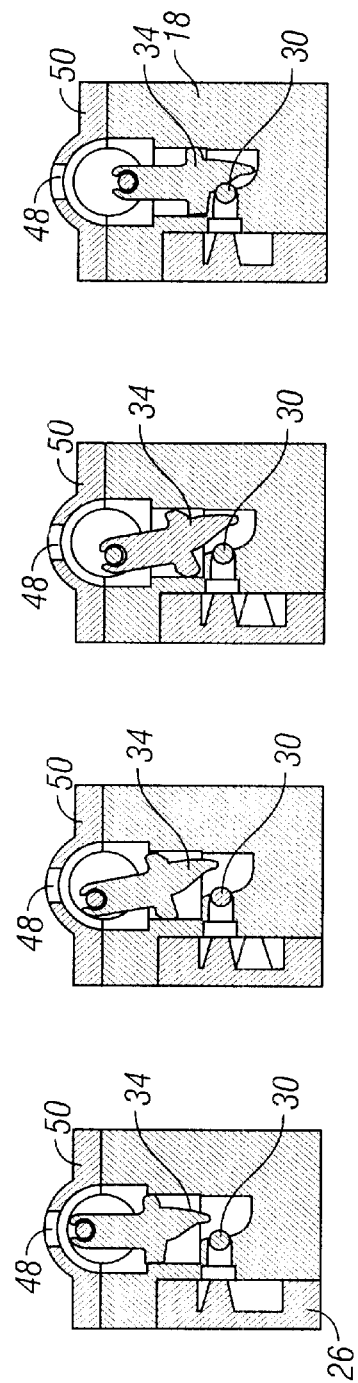

PNEUMATIC MOTOR

BACKGROUND OF THE INVENTION

The present invention relates to pneumatic operated motors, and in particular to a motor that uses compressed fluid or air to power the motor. A pneumatic motor may be used in a wide variety of applications, from wheeled vehicles to propeller operated airplanes and helicopters, as well as air powered boats. In addition, other applications in various other fields of use are just now being realized, such as any air powered or battery powered product.

One problem in the prior art, which is realized and solved by the present invention, is simplicity. The ability to provide an efficient pneumatic motor without the need of complicated intake and exhaust ports, spring operated pistons, valve rods, piston connection rods, individual seals, specially designed seal skirts, complicated drive axle mountings, etc. All of which complicates the manufacturing of the pneumatic motor and increases the likelihood that an individual part will break making the motor inoperable. As such a need exists to improve upon the prior art pneumatic motors. Such an improvement should simplify the manufacturing by eliminating the need for complicated mechanisms, additional rods, seals, springs and etc. such an improvement will further provide for pneumatic motors that may be made smaller, lighter and less expensive than other prior art motors.

For example, U.S. Pat. No. 4,329,806 to Akiyama discloses a fluid engine for use in pneumatic operated toys. The '806 patent uses a complicated structure that includes a intake valve rod that is connected to a disc element that is also connected to a parallel drive axle. A piston, perpendicular to the drive axle and the valve rod, is in communication with the disc element that is rotated by the upward and downward movement of the piston. The disc element also includes a profile surface in contact with the valve rod. When the disc element rotates, the profile surface causes the valve rod to move inwardly, when the piston is moving upwardly, and to move outward, when the piston is moving downwardly. In addition, when the valve rod moves inwardly, fluid or compressed air enters the chamber. The air pushes the piston upwards and eventually expels out of a side exhaust. The inertia in the drive axle caused of the upward movement of the piston will continue to move the piston downwards such that the process will continue, until the air runs out.

U.S. Pat. No. 6,006,517 to Kowanacki utilizes a compressed spring to close an intake valve, where air enters into the cylinder or chamber. A valve member is pushed upwardly by the compressed spring against an aperture creating a air tight seal. A piston moving downwards pushes the member down passed an intake valve, allowing compressed air to flow over the member through the aperture into a chamber. The air pushes the piston up causing a drive axle attached thereto to rotate. Once the piston is moved up the compressed spring pushes the member back up closing the intake valve. Moreover, the air entering the chamber with the piston escapes out of side exhaust ports (cut into the chamber) when the piston reaches the top position. U.S. Pat. No. 6,085,631 utilizes the same principles in the '517 patent except it introduces a low/high pressure seal that expands when air is pressed up against it.

In addition it is well known that when manufacturing, the size of the product will be dependent upon all of the parts. If a pneumatic motor is desired to be extremely small, say the size of about an inch in length or less, it would be virtually and/or practically impossible using the pneumatic motors of the prior art to manufacture all of the parts small enough and assembly the same to fit this size. A benefit realized by the pneumatic motor of the present invention was found that the size could be made extremely small because of the simplicity of the present invention.

However on the other extreme, because of the simplicity it is also extremely easy to make the pneumatic motor larger. As such, the present invention finds applicability in compressed fluid-powered engines used for operating automobiles, such as described by U.S. Pat. No. 6,006,519. The '519 patent discloses a compressed air-powered engine designed for use in an internal combustion engine, using a "Wankel-type rotary engine."

SUMMARY OF THE INVENTION

In accordance with the present invention a pneumatic motor is provided. The pneumatic motor includes at least one piston, each of which is attached to a crank shaft such that when the piston moves upwardly and downwardly an axle attached to the crank shaft rotates therewith. The pneumatic motor includes a housing having a cylinder for each piston. Each cylinder is in fluid communication with a corresponding intake channel in the housing that is also in fluid communication with an intake chamber. Each cylinder further has a corresponding exhaust through the top portion of the housing. Each intake channel houses a member that seals the corresponding cylinder from the intake channel when compressed fluid initially enters the intake channel or when the pressure in the intake channel is greater then the pressure in the cylinder.

Each piston is preferably defined by a single rigid piece that has a connecting rod extending upwardly to attach to the crank shaft, an actuator that extends downwardly to contact and push the member, and has a section with a diameter that is defined to create a temporary or artificial fluid seal against the corresponding cylinder wall. As mentioned above, extending downwardly from each piston is an actuator that has a profile or camber defined such that the actuator may exert a force against the member sufficient to push the member into the intake channel allowing compressed fluid in the intake channel to enter the corresponding cylinder.

The piston also includes a section that has a diameter that is defined to create a temporary or artificial fluid seal against the corresponding cylinder wall, such that compressed fluid entering the corresponding cylinder via the intake channel cannot initially escape. As such, the compressed fluid exerts a force against the section pushing the cylinder upwardly. The section further includes exhaust grooves formed therein and positioned such that the fluid seal is created only during upward movement of the piston and the fluid seal is broken during downward movement of the piston. This is caused because during the upward and downward movement of the piston, the connecting rod is a rigid extension of the piston that connects to a rotating crank shaft, such that the piston also pivots within the cylinder. When the fluid seal is temporarily broken, compressed fluid in the cylinder below the section escapes upwardly past the section and out through the exhaust. This also causes the compressed fluid in the intake channel to push the member back against the cylinder ensuring that the member re-seals the cylinder from the intake channel.

Inertia from the crank shaft, caused by the upward stroke of the piston, continues to move the piston through the downward stroke into a position in the upward stroke that causes the actuator to contact and push the member inwardly allowing the compressed fluid to reenter the cylinder. Thereby creating a cycle that will continue as long as the supply of compressed fluid to the intake channel(s) is maintained.

The present invention may be designed as small as manufacturing allows as well as large as desired. The present invention may therefore find applicability in full-scale air compressed engines that may be used in vehicles, planes, boats, helicopters, as well as miniature-scaled engines used to operate toys and/or other consumer or industrial air powered or battery powered products.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein:

FIG. 1 is a perspective cross-sectional view of a single piston pneumatic motor in accordance with one embodiment of the present invention;

FIG. 2 is a cross-sectional view of the pneumatic motor from FIG. 1;

FIGS. 3a–3i are cross-sectional view s of the pneumatic motor from FIG. 1, illustrating the piston through various stages of a single cycle;

DETAILED DESCRIPTION OF THE EMBODIMENTS

Figure 4:
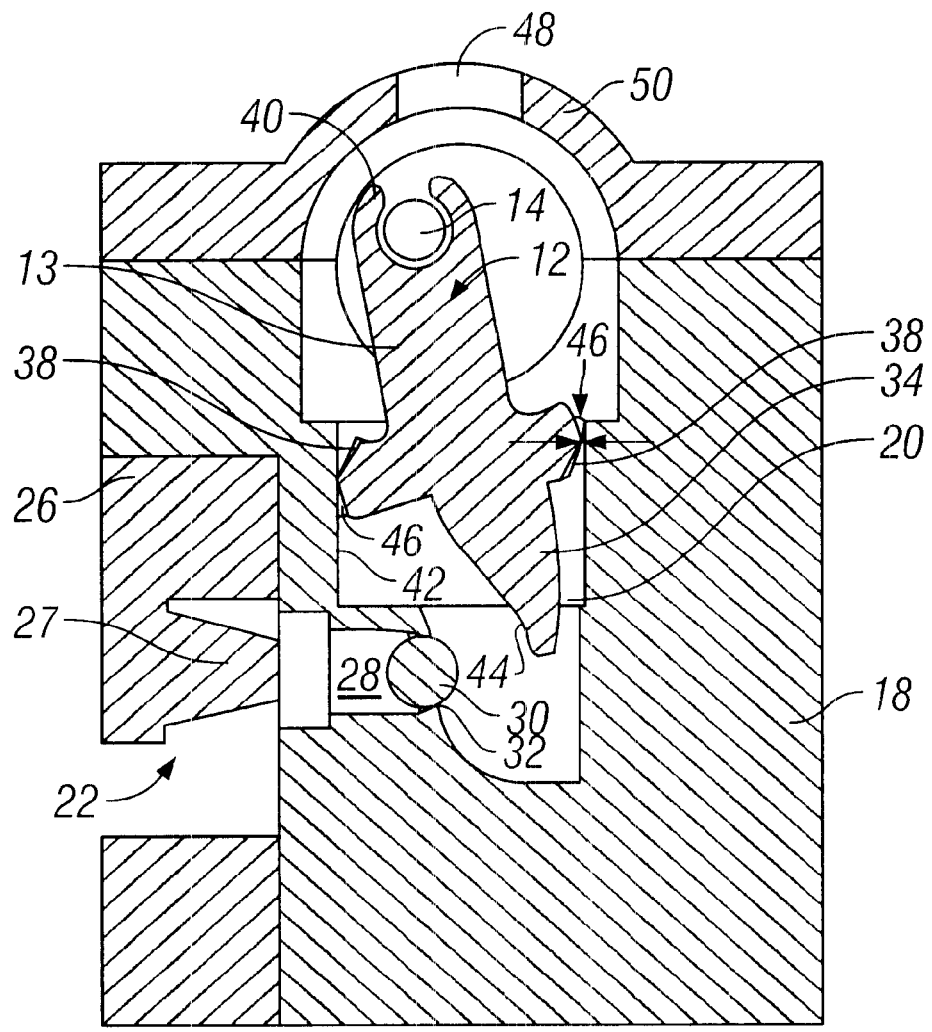
FIG. 4 is a cross-sectional view of the pneumatic motor from FIG. 1, illustrating the piston during the down stroke with the seal between the section and the cylinder walls open allowing compressed fluid to vent.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Figure 5:
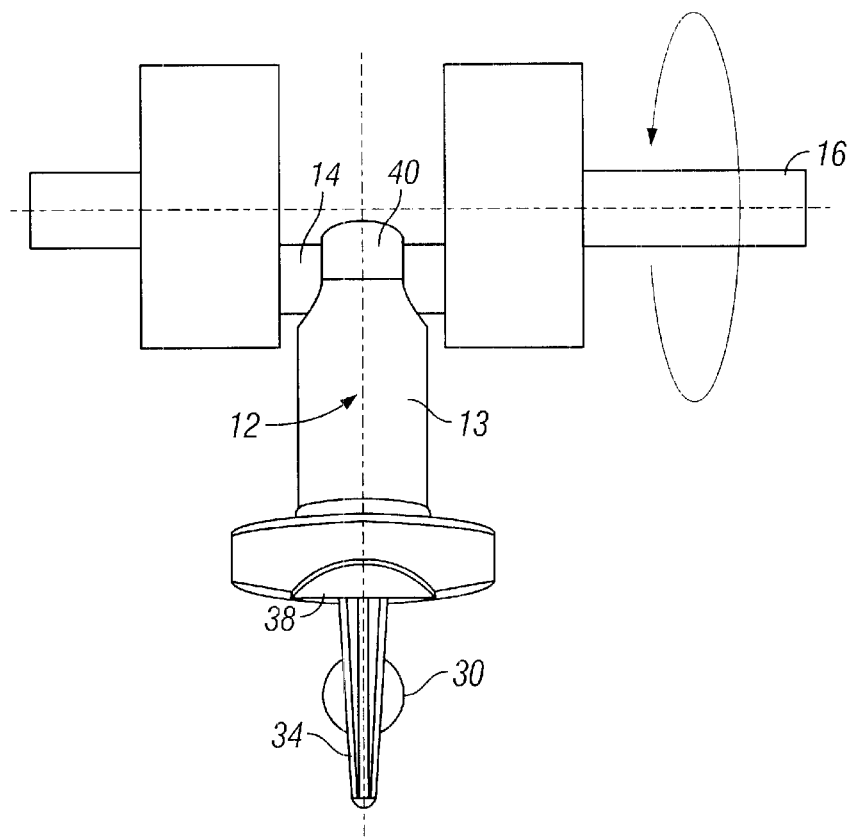
FIG. 5 is a rear view of the piston and crank from FIG. 1.
Figure 6:
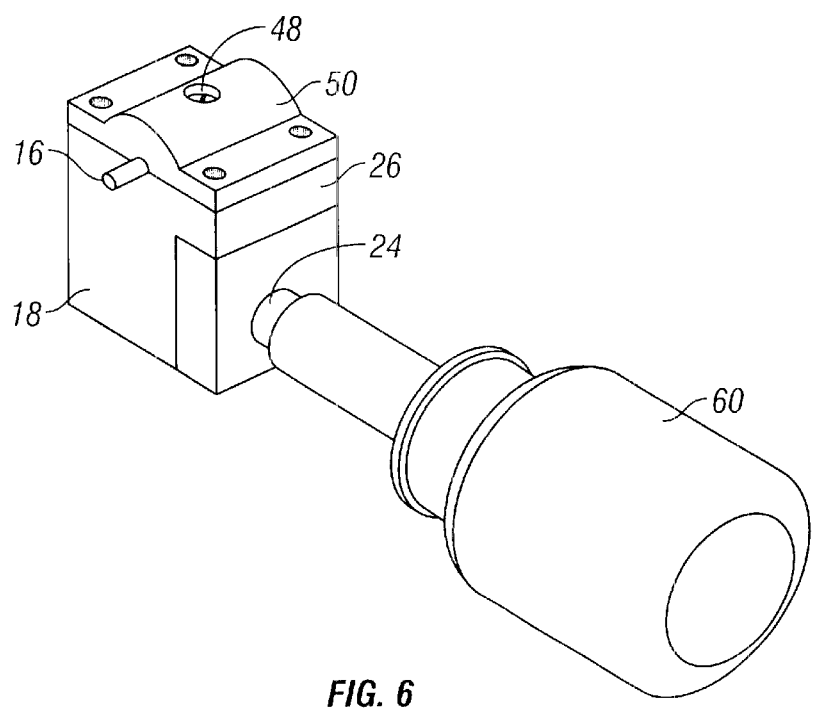
FIG. 6 is a pneumatic motor with an external tank of compressed fluid.

Referring now to FIGS. 1 and 2, a pneumatic motor 10 in accordance with one embodiment of the present invention includes a piston 12 attached to a crank shaft 14. The crank shaft 14 when rotating drives a main axle 16 (shown in FIG. 5). The main axle 16 may then be attached, by various known means in the art, to any means operable from a motor. Such motor operable means may include wheels and propellers; however, the specific invention is not necessarily limited to such commonly known motor operable means and may also include the ability to produce electrical power from the rotation of the main axle 16, or may be attached to any compressed fluid or compressed air powered product.

Continuing to refer to FIGS. 1 and 2, the motor 10 is defined by a main housing 18, an intake housing 26 and a top motor housing 50. The main housing 18 includes a cylinder 20 integrally molded or bored therethrough. The pneumatic motor 10 is powered by compressed fluid, preferably air, that enters into an intake chamber 22 from an external line 24. The intake chamber 22 is formed inside of the intake housing 26, which is secured to the main housing 18.

From the intake chamber 22, the compressed fluid enters into an intake channel 28 that is grooved into the main housing 18. A member 30, having a diameter less than the diameter of the intake channel 28 is contained therein. The intake channel 28 also includes an intake aperture 32 leading into the cylinder 20 permitting the intake channel 28 to be in fluid communication with the cylinder 20. To keep the member 30 in the intake channel 28, a portion of the entrance of the intake chamber 22 is covered by a protrusion 27 formed out of the intake housing 26. The diameter of the intake aperture 32 is also smaller then the diameter of the member 30, such that the member 30 may extend partly into the cylinder 20 but will not entirely enter into the cylinder 20.

When the cylinder 20 is empty or when it contains fluid that has a pressure less then the pressure of compressed fluid in the intake channel 28, the compressed fluid will act on the member 30 pushing it against the intake aperture 32 creating a fluid tight seal. As such the compressed fluid is prevented from entering the cylinder 20. As discussed in greater detail below, to allow compressed fluid to enter into the cylinder 20, the member 30 is forced or pushed back into the intake channel 28 toward the protrusion 27 by an actuator 34 integrally formed into the lower portion of the piston 12. Once the member 30 is pushed into the intake channel 28, compressed fluid will flow around the member 30 and enter the cylinder 20 through the intake aperture 32.

Continuing to Refer to FIG. 2, the piston 12 and the movement of the piston will now be described in detail. As opposed to other prior art pneumatic motors, the present invention preferably includes a piston 12 that incorporates therein a connecting rod 13, a section 36, an actuator 34 (or a means to allow compressed fluid into the cylinder 20) and exhaust grooves 38 as a single integrally molded piece. However, the present invention may also include a rigid piston that includes as separate parts the connecting rod, the section and the actuator attached thereto.

In other prior art piston motors, the piston and connecting rod are separate. Attached to each other by various gears allowing the piston to move vertically and the connecting rod to transfer the rotation motion of the crank shaft to the piston. However, the present invention incorporates the connecting rod 13 into the piston 12, this causes the piston to move vertically as well as pivotally. As thus permits the piston 12, of the present invention, to perform like a rocker arm or cam utilized in most prior art patents. In addition, the other functions and characteristics in this invention, defined by the movement of the piston 12, are also possible.

Referring still to FIG. 2, the connection rod 13 includes a top portion 40 that clips onto the crank shaft 14. Other attachment means may also be used; for example, the top portion 40 could simply include an aperture that permits the crank shaft 14 to slide therethrough. The crank shaft 14 is further attached to a crank 15, which is attached to the main axle (not shown).

From the position shown in FIG. 2, as soon as the piston 12 moves upward, or during the power stroke as more commonly referred to, illustrated in FIG. 3a, the actuator 34 begins to push against the member 30, forcing the member 30 into the intake channel 28. At this point compressed fluid enters the cylinder 20 and pushes against the section 36 forcing the piston upwards or through its power stroke, FIGS. 3a–3d. It is important to note, that the section 36 has a diameter that creates a temporary fluid seal against the cylinder walls 42, during the upward stroke or power stroke of the piston 12. At some point prior to top dead center or the position prior to beginning the downward or exhaust stroke, shown in FIG. 3e, the actuator 34 on the piston 12 disengages the member 30, but the compressed fluid will continue to push against the section 36, because of the fluid seal.

Another important aspect to note is that the profile 44 of the actuator 34 is defined such that the actuator 34 is in continual engagement with the member 30 during a predetermined part of the [cycle] power stroke. As illustrated in FIGS. 3a–3i, when the piston 12 is moving through a single rotation on the crank 15, the piston 12 also pivots, tilts or oscillates back and forth. The profile 44 of the actuator 34 is therefore a function of the pivoting of the piston 12 and the profile of the member 30, such that the actuator 34 exerts a sufficient and continued amount of pressure on the member 30 to force or push the member 30 into the intake channel 28. In addition the profile 44 of the actuator 34 is also a function on the amount of compressed fluid needed to enter the cylinder 20 and force the piston 12 upwards. If the cylinder 20 is larger, more compressed fluid may be needed in the cylinder 20 to properly force the piston 12 through the upward or power stroke, as such the profile 44 may need to be extended to keep pressure on the member 30 longer.

As mentioned above, throughout this upward movement or power stroke of the piston 12, a fluid seal is created between the section 36 and the cylinder wall 42 and maintained preventing the compressed fluid from exiting the cylinder 20. The inertia of crank shaft 14 will continue to move the piston 12 past the top dead center position, illustrated in FIG. 3f. Once it is through top-dead center, illustrated in FIGS. 3g–3h, the piston 12 begins to pivot in the opposite direction as shown in FIGS. 3a–3d. The pivot during the downward or exhaust stroke breaks the fluid seal between the section 36 and the cylinder wall 42, because exhaust grooves 38 (one of which is better illustrated in FIG. 5) formed into the section 36 create temporary passages 46 between the section 36 and the cylinder wall 42, also shown in FIG. 4. The compressed fluid is now able to escape and will continue to escape out of the cylinder 20 until the pneumatic seal between the section 36 and the cylinder wall 42 is re-created. Preferably the fluid seal is broken at a position before top-dead center, FIG. 3f, and created at a position after bottom-dead center or a position defined in the power stroke, FIG. 3i. However, altering the depth of the exhaust groove 38 may change these positions.

As opposed to other prior art piston motors, the present invention's temporary fluid seal between the piston 12 and the cylinder wall 42 is unique in that the seals utilized in other prior art motors are engaged during the upward or power stroke and downward or exhaust stroke of the piston. Typically, the prior art motors never break the seal. The compressed fluid is allowed to exhaust usually through a side exhaust channel that is open when the piston reaches top dead center. As soon as the prior art pistons begin the downward or exhaust stroke, the seal is re-created. This causes a loss in performance, because the piston will utilize inertia re-compressing any fluid trapped under the seal during the downward stroke and fighting the re-compressed fluid, in order to return to a position that allows more compressed fluid into the cylinder. However, since the present invention maintains the open passages 46 during the downward stroke and as mentioned above for a portion of the power stroke, there will be virtually no loss or recompression of any fluid during the downward or exhaust stroke.

Figure 7:
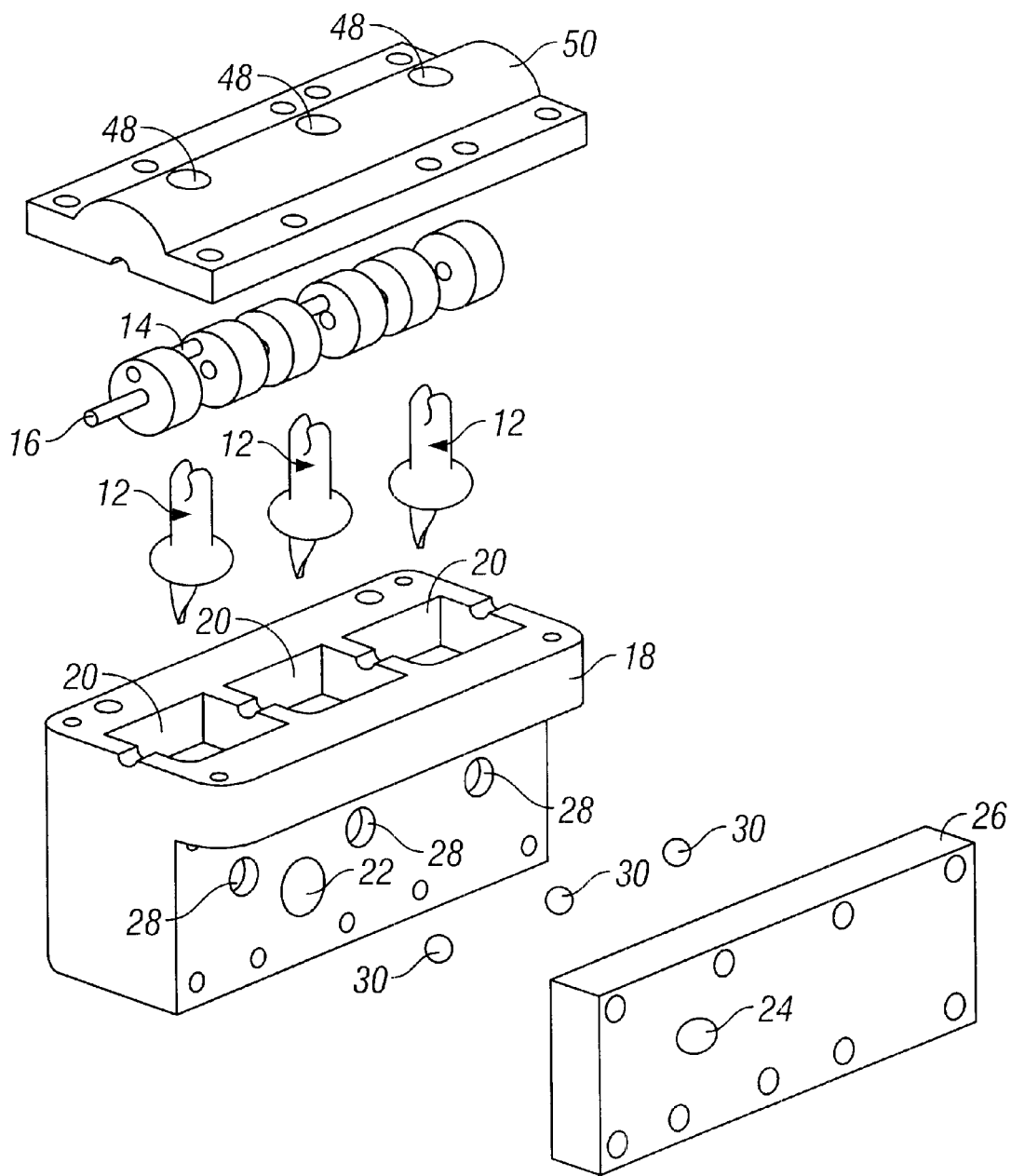
FIG. 7 is an exploded view of a three piston pneumatic motor in accordance with another embodiment of the present invention.

In addition to the single piston pneumatic motor illustrated herein, multiple piston motors are provided for in additional embodiments. As illustrated in FIG. 7 a three piston 12 pneumatic motor 10 is shown; however two piston pneumatic motors are also embodied herein. The principles discussed herein above for the single piston 12 motor are applicable with a multiple piston motor. In addition, while the pistons are illustrated in series, the pistons could further be provided for in an offset motor, such as found in typical V-8 engines.

Figure 8:
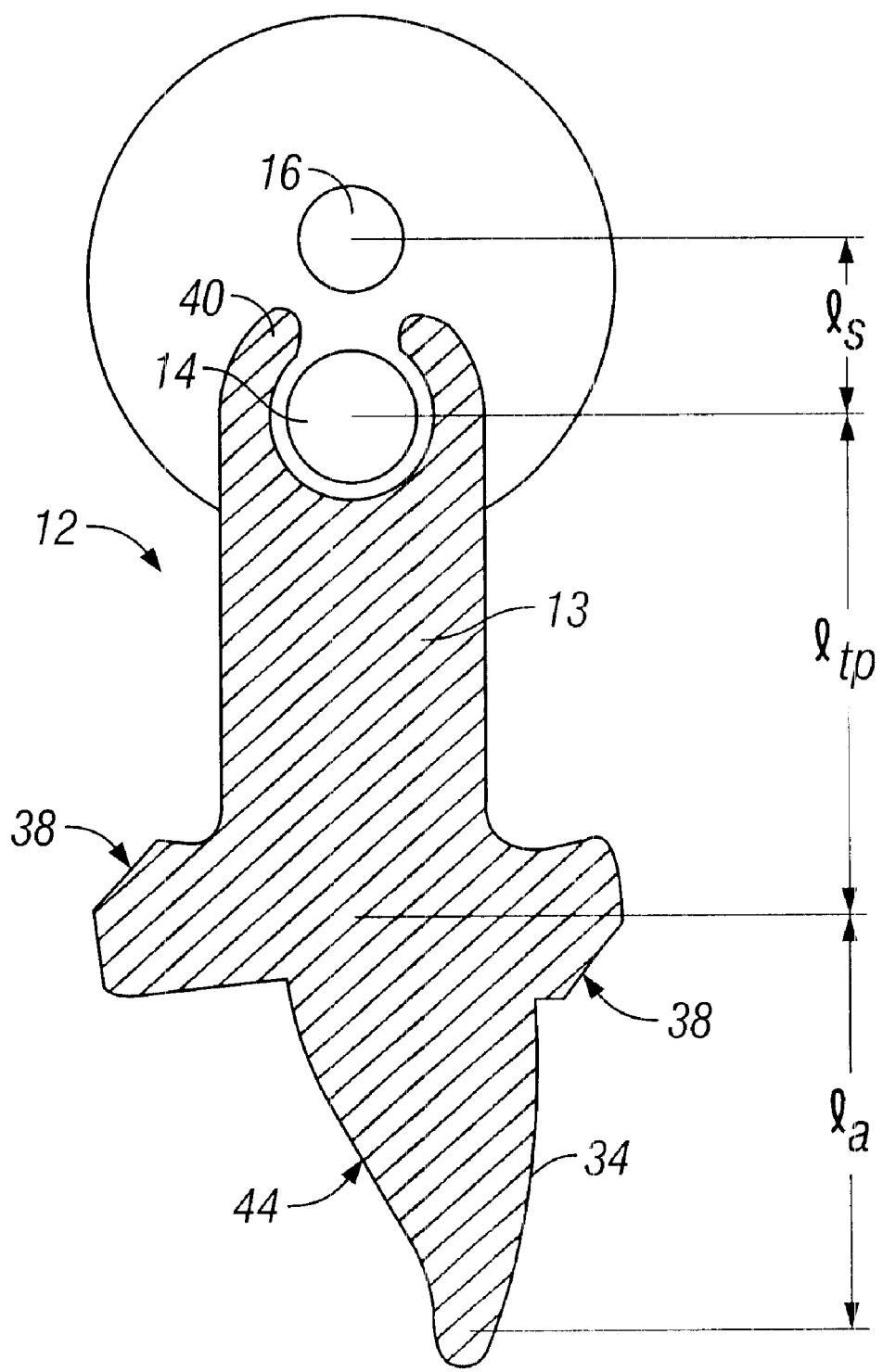
FIG. 8 is a cross-sectional view of a piston in accordance with the present invention.

Referring now to FIG. 8, it should be further understood that changing various dimensions of the piston 12 could alter the performance of the pneumatic motor 10. For instance increasing the exhaust grooves 38 would permit the compressed fluid to exhaust longer. This may be required where the outside fluid is different then the compressed fluid, or where the outside pressure warrants a longer exhaust. The profile 44 may also be changed to control the amount of compressed fluid that enters into the cylinder 20. The length $l_a$ of the actuator 34 may be changed to alter the time the cylinder is under pressure. The length $l_p$ defined by the distance between axis of the crank shaft 14 to the section 34 (length of the connecting rod 13) may be changed to change the stroke length. This could be decreased to further compact the motor. In addition the stroke length is defined by the distance from the drive axle 16 to the axis of the crank shaft 14 may be changed to affect the speed of the motor.

In accordance with the present invention, the pneumatic motor disclosed herein may be designed as small as manufacturing allows as well as large as desired. The present invention may therefore find applicability in full-scale air compressed engines that may be used in vehicles, planes, boats, helicopters, as well as miniature-scaled engines used to operate toys or other small motor operated devices without the need for batteries.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A pneumatic motor for rotating an axle comprising:
   a housing defining at least an intake chamber to receive a compressed fluid, an intake channel in fluid communication with the intake chamber, and a cylinder in fluid communication with the intake channel, the housing further defining an exhaust that is distal to the intake channel and in fluid communication with the cylinder such that the compressed fluid may exit the cylinder;
   a member positioned in the intake channel to seal the cylinder from the intake channel, when the cylinder contains a pressure less then the compressed fluid in the intake channel;
   a piston attached to the axle and sized to be received in the cylinder such that the piston exhibits an oscillating power stroke and exhaust stroke, when the axle is rotating;
   an actuator extending away from the piston for a predetermined length and having a profile defined such that, during a predetermined portion of the power stroke, the actuator exerts a force against the member sufficient to push the member into the intake channel allowing compressed fluid in the intake channel to enter the cylinder; and a section defined by the piston and having a diameter to create a temporary seal against the cylinder during a predetermined portion of the power stroke, such that compressed fluid that enters the cylinder via the intake channel will exert a force against the section pushing the cylinder through the power stroke, the section further includes exhaust grooves formed therein and positioned such that said temporary seal is broken during a predetermined portion of the exhaust stroke, wherein when the seal is broken compressed fluid in the cylinder below the section may vent past the section and out through the exhaust, which causes the pressure in the cylinder to become lower than the pressure of the compressed fluid in the intake channel and ensures that the member re-seals the cylinder from the intake channel.

2. The motor of claim 1, wherein the piston is attached to the axle via a crank and inertia caused by the power stroke of the piston acting on the crank causes the piston to move through the exhaust stroke and beginning portion of the power stroke to a position that causes the actuator to engage and push the member into the intake channel to allow compressed fluid into the cylinder.

3. The motor of claim 2, wherein the actuator is integrally formed to the piston.

4. The motor of claim 3, wherein the intake chamber includes an external port in fluid communication with an external tank, the external tank having the compressed fluid contained therein.

5. The motor of claim 3, wherein the intake chamber includes an external port in fluid communication with a pump system, the pump system having the ability to supply compressed fluid to the pneumatic motor.

6. The motor of claim 1, wherein the intake chamber includes a protrusion in front of the intake channel to prevent the member from entering the intake chamber.

7. The motor of claim 1, wherein the profile of each actuator is defined by a motion of the piston, a profile defined by the member, and time needed to allow a sufficient amount of compressed fluid into each cylinder, such that the actuator will exert a sufficient and continued amount of pressure on the member to push the member into the intake channel allowing the sufficient amount of compressed fluid into the cylinder to force the piston upwardly.

8. The piston of claim 1, wherein the actuator has a predetermined length that is a function of an amount of time the valve is opened.

9. The motor of claim 1, wherein the actuator has a predetermined length that is a function of an amount of time compressed fluid is allowed to enter into the cylinder, such that when the predetermined length of the actuator is increased, the amount of compressed fluid entering the cylinder would be increased.

10. The motor of claim 1, wherein the piston is attached to the axle by a connecting rod extending away from said section, the connecting rod has a length that is a function of an amount of inertia that the piston uses to oscillate the actuator to engage the valve, such that when the length of the connecting rod is increased the amount of inertia used to oscillate the actuator to engage the valve is decreased.

11. A pneumatic motor for rotating an axle comprising:
a housing defining at least two cylinders, each cylinder sized to receive a corresponding piston, each cylinder is in fluid communication with a corresponding intake channel in the housing that is in fluid communication with an intake chamber defined by the housing, and at least one exhaust;

a crank attached to the axle and the pistons such that when the pistons move the axle rotates therewith, the movement of said pistons is further defined as an oscillating power stroke and exhaust stroke;

a member positioned in each intake channel that seals the corresponding cylinder from the intake channel when compressed fluid initially enters the intake channel;

an actuator extending away from each piston and having a profile defined such that the actuator may exert a force against the member sufficient to push the member into the intake channel allowing compressed fluid in the intake channel to enter the corresponding cylinder; and a section defined on each piston and having a diameter larger then the actuator that creates a fluid seal against the corresponding cylinder such that compressed fluid entering the corresponding cylinder via the intake channel will exert a force against the section pushing the cylinder through the power stroke, the section further includes exhaust grooves formed therein and positioned such that said fluid seal is broken during the exhaust stroke, wherein when the fluid seal is broken compressed fluid in the cylinder may escape through the corresponding exhaust, which causes the compressed fluid in the intake channel to act against the member ensuring that the member re-seals the cylinder from the intake channel.

12. The motor of claim 11, wherein inertia caused by the power stroke of the piston acting on the crank causes the piston to move through the exhaust stroke and at least begin again the power stroke to a position, during the power stroke, that causes the actuator to contact and push the member into the intake channel to allow compressed fluid into the cylinder.

13. The motor of claim 11, wherein the profile of each actuator is defined by a motion of the piston, a profile defined by the member, and time needed to allow a sufficient amount of compressed fluid into each cylinder, such that the actuator will exert a sufficient and continued amount of pressure on the member to push the member into the intake channel allowing the sufficient amount of compressed fluid into the cylinder to force the piston upwardly.

14. The motor of claim 11, wherein the section is integrally formed from the piston.

15. The motor of claim 14, wherein the intake chamber includes a protrusion in front of each intake channel to prevent the members from entering the intake chamber.

16. The motor of claim 11, wherein the actuator is integrally formed to the piston.

17. The motor of claim 11, wherein the pistons are offset from each other.

18. A pneumatic motor comprising an intake chamber in fluid communication with at least one intake channel, each intake channel is further in fluid communication with a corresponding cylinder, each cylinder receiving a piston that cycles through an oscillating power stroke and exhaust stroke to rotate a motor axle, a valve member in each intake channel will seal the corresponding cylinder from each intake channel when compressed fluid in the intake channel has a higher pressure than pressure in the corresponding cylinder, each piston further includes an actuator extending downwardly from the piston and having a profile that, during a portion of the power stroke, causes the actuator to push the member back into each intake channel to allow compressed fluid to enter each of the corresponding cylinders, each piston further includes a section that has a diameter that creates a fluid seal against the corresponding cylinder during a portion of the power stroke such that compressed fluid that enters the corresponding cylinder during said portion of the power stroke will push the piston through the power stroke, each section further includes at least one exhaust vent defined thereon, such that during the exhaust stroke the fluid seal is broken allowing compressed fluid in the cylinder to bypass the section of the piston and escape through an exhaust in the motor, which causes the compressed fluid in the intake channel to push the member to re-seal the cylinder from the intake channel, the movement of the piston during the power stroke further generates inertia that moves each piston through the exhaust stroke to a position in the power stroke that causes the actuator on each piston to contact and push the corresponding member into the intake channel defining a complete cycle, wherein said complete cycle will continue as long as compressed fluid is supplied to the intake chamber.

19. The motor of claim 18, wherein the profile of each actuator is defined by a motion of the piston, a profile defined by the member, and time needed to allow a sufficient amount of compressed fluid into each cylinder, such that the actuator will exert a sufficient and continued amount of pressure on the member to push the member into the intake channel allowing the sufficient amount of compressed fluid into the cylinder to force the piston upwardly.

20. The motor of claim 18, wherein the section is integrally formed from the piston.

21. The motor of claim 18, wherein the intake chamber includes a protrusion in front of each intake channel to prevent the members from entering the intake chamber.

22. The motor of claim 18, wherein the intake chamber includes an external port in fluid communication with an external tank, the external tank having the compressed fluid contained therein.

23. The motor of claim 18, wherein the intake chamber includes an external port in fluid communication with a pump system, the pump system having the ability to supply compressed fluid to the pneumatic motor.

24. The motor of claim 1, wherein the crank is offset from the axle by a predetermined offset length and the offset length further defines an amount of oscillation the piston exhibits within the cylinder, such that when the offset length is increased the amount of oscillation is increased.

25. A pneumatic motor comprising at least one piston, each sized to be received in a corresponding cylinder, each piston is further defined by having a section that has a diameter that creates a fluid seal against the corresponding cylinder during a power stroke of the piston, each section further includes exhaust vents positioned to temporarily open the fluid seal during an exhaust stroke of the piston, the piston further including a connecting rod extending away from the section to engage a crank shaft, and an actuator extending away from the section and having a means to allow compressed fluid into the cylinder.

26. The motor of claim 25 wherein the section, connecting rod and the actuator is a single rigid piece.

27. The motor of claim 25 wherein the means to allow compressed fluid into each cylinder is further defined as:
  each cylinder being in fluid communication with a corresponding intake channel, each intake channel having a member sized to create a fluid seal between the cylinder and the corresponding intake channel when the cylinder contains a pressure less then the compressed fluid in the intake channel, and
  each actuator having a profile defined to push the member into the intake channel to brake the fluid seal and allow compressed fluid contained in the intake channel to enter into the corresponding cylinder, during a portion of the power stroke of the piston.

28. The motor of claim 27, wherein the exhaust vents are defined such that the fluid seal between the piston and the cylinder is broken during the exhaust stroke of the piston such that compressed fluid in the cylinder is permitted to vent during the exhaust stroke of the piston.

29. The motor of claim 28, wherein each piston generates inertia in the crank shaft during the power stroke of the piston such that the inertia continues to move each piston through the exhaust stoke to a position in the power stroke that causes the actuator on each piston to push the corresponding member into the intake channel allowing compressed fluid back into the cylinder.

30. The motor of claim 29, wherein each piston will continue to move through the power and exhaust strokes as long as compressed fluid is supplied to the intake channel.

31. A pneumatic motor comprising: at least one piston, each sized to be received in a corresponding cylinder, each piston is further defined by having a section that has a diameter that creates and maintains a fluid seal against the corresponding cylinder, when the piston is moving in a first direction and each section further includes exhaust vents positioned to temporarily open the fluid seal, when the piston is moving in a second direction, each piston further includes a rigid connecting rod extending away from the section to engage a crank shaft, and a rigid actuator extending away from the section and having a means to allow compressed fluid into the cylinder for a predetermined amount of time.

32. The pneumatic motor of claim 31, wherein the movement of the piston is defined as a cyclic power and exhaust stroke and also defined as an oscillating rocking motion.

33. The pneumatic motor of claim 32, wherein the fluid seal is created and maintained during a portion of the power stroke.

34. The pneumatic motor of claim 31, wherein the exhaust vents temporarily open the fluid seal during the exhaust stroke.

35. The pneumatic motor of claim 34, wherein the exhaust vents also temporarily open the fluid seal during a portion of the power stroke defined as a portion prior to when the allowing means permits compressed fluid into the cylinder.

36. The motor of claim 31, wherein the means to allow compressed fluid into each cylinder is further defined as each actuator having a profile defined to engage and temporarily open a valve for said predetermined amount of time, said valve being defined in the motor as a means for preventing compressed fluid into the cylinder.

37. The motor of claim 36, wherein the oscillating rocking motion of the piston causes the actuator to engage the valve during a portion of the power stroke.

38. The motor of claim 37, wherein the connecting rod has a length that is a function of the amount of inertia that the piston uses to rock the actuator to engage the valve, such that when the length of the connecting rod is increased the amount of inertia used to rock the actuator to engage the valve is decreased.

39. A piston for use in a pneumatic motor, the piston comprising:
  a section that has a diameter that creates a fluid seal against a cylinder defined by the pneumatic motor, when the piston is moving in a first direction, and the section further includes exhaust vents positioned to temporarily open the fluid seal, when the piston is moving in a second direction, a rigid connecting rod extending in a first direction away from the section to engage a crank shaft defined by the pneumatic motor; and a rigid actuator extending in a second direction away from the section and having a means to engage and temporarily open a valve for a predetermined period of time, the valve being defined by the pneumatic motor as a means to prevent compressed fluid into the cylinder.

40. The piston of claim 39, wherein when the motor is operating, the piston exhibits a cyclic power stroke and exhaust stroke motion as well as a oscillating rocking motion, such that the piston rocks in a first direction during the power stroke and rocks in a second direction during the exhaust stroke.

41. The piston of claim 40, wherein the actuator includes a profile defined to engage and temporarily open said valve for a predetermined portion of the power stroke.

42. The piston of claim 40, wherein the fluid seal is created and maintained during a portion of the power stroke.

43. The piston, of claim 40, wherein the fluid seal is temporarily opened during the exhaust stroke.

44. The piston of claim 40, wherein the oscillating rocking motion causes the actuator to engage and disengage the valve and causes the section to create and open the fluid seal.

45. A piston for use in a motor, wherein the motor includes at least a cylinder for receiving said piston, a crank shaft and a valve for preventing fluid from entering the cylinder, the piston comprising:

a section that has a diameter that creates and maintains a fluid seal against an interior wall defined by the cylinder, during a portion of a power stroke of the piston, and the section further includes exhaust vents positioned to temporarily open the fluid seal, during a portion of an exhaust stroke of the piston and a portion of the power stroke;

a connecting rod extending in a first direction away from the section to engage said crank shaft; and an actuator extending in a second direction away from the section and having a means to engage and open said valve for a portion of the power stroke that includes at least said portion of the power stroke when the fluid seal is created and maintained.

46. The piston of claim 44, wherein the piston is a uniform rigid construction.

47. The piston of claim 44, wherein the means to engage and open said valve is defined as the actuator having a profile that engages and temporarily opens said valve for said portion of the power stroke that includes at least said portion of the power stroke when the fluid seal is created and maintained.

48. The motor of claim 18, wherein the actuator is integrally formed to the piston.

49. A motor comprising at least one piston attached to a crank such that that when the motor is operating, the piston exhibits a cyclic power stroke and exhaust stroke motion and an oscillating rocking motion, the piston including a section that creates and maintains a fluid seal against a corresponding cylinder during a portion of the power stroke and when rocking in a first direction and opens said fluid seal during a portion of the exhaust stroke and when rocking in a second direction, and the piston further includes a rigid actuator extending away from the section and having a means to allow compressed fluid into the cylinder during a portion of the power stroke and when the piston is rocking in said first direction.

50. The motor of claim 48, wherein the piston is attached to the crank by a rigid connecting rod extending away from the section to engage a crank shaft.

51. The motor of claim 49, wherein the connecting rod has a length that is a function of the amount of inertia that the piston uses to rock the actuator to allow compressed fluid into the cylinder, such that when the length of the connecting rod is increased the amount of inertia used to rock the actuator to allow compressed fluid into the cylinder is decreased.

52. The motor of claim 48, wherein the means to allow compressed fluid into the cylinder is defined as the actuator having a profile that engages and temporarily opens a valve for said portion of the power stroke that includes at least said portion of the power stroke when the fluid seal is created and maintained.

* * * * *